(12) United States Patent
Foss, Jr.

(10) Patent No.: US 7,469,224 B2
(45) Date of Patent: Dec. 23, 2008

(54) REAL-TIME POINT-OF-SALE CHANGE-OF-ADDRESS PROCESSING

(75) Inventor: Sheldon H. Foss, Jr., Suwanee, GA (US)

(73) Assignee: Compucredit Intellectual Property Holdings Corp. III, Las Vegas, NV (US)

( * ) Notice: Subject to any disclaimer, the term of this patent is extended or adjusted under 35 U.S.C. 154(b) by 675 days.

(21) Appl. No.: 10/837,164

(22) Filed: Apr. 30, 2004

(65) Prior Publication Data

US 2005/0080724 A1    Apr. 14, 2005

Related U.S. Application Data

(63) Continuation-in-part of application No. 10/685,277, filed on Oct. 14, 2003.

(51) Int. Cl.
    *G06Q 40/00*    (2006.01)
(52) U.S. Cl. .............................. 705/35; 705/28; 705/43; 705/44; 707/3; 707/102; 382/101; 382/115
(58) Field of Classification Search ............. 705/35–45, 705/52, 28; 713/186; 707/3, 102; 382/101–115
    See application file for complete search history.

(56) References Cited

U.S. PATENT DOCUMENTS

| | | | | |
|---|---|---|---|---|
| 5,146,403 A | * | 9/1992 | Goodman .................... | 707/102 |
| 6,047,261 A | * | 4/2000 | Siefert ......................... | 705/11 |
| 6,205,478 B1 | * | 3/2001 | Sugano et al. .............. | 709/223 |
| 6,304,647 B1 | * | 10/2001 | Frost ...................... | 379/201.12 |
| 6,363,164 B1 | * | 3/2002 | Jones et al. .................. | 382/135 |
| 2002/0059142 A1 | * | 5/2002 | Krause et al. ................. | 705/44 |
| 2003/0217005 A1 | * | 11/2003 | Drummond et al. .......... | 705/43 |
| 2004/0059638 A1 | * | 3/2004 | Aieta et al. ................... | 705/26 |
| 2005/0197954 A1 | * | 9/2005 | Maitland et al. ............. | 705/39 |

OTHER PUBLICATIONS

Anita Kumar, Banks watching what you buy, Dec. 17, 2001, St. Petersburt Times.*
No author, Clearcommerce: Clearcommerce increases fraud prevention offerings, expands support for Visa and Mastercard programs; Enhances protection of online merchant's revenue and profit from fraud attacks, M2 Presswire, Sep. 16, 2003.*

* cited by examiner

*Primary Examiner*—Mary Cheung
*Assistant Examiner*—Brian Fertig
(74) *Attorney, Agent, or Firm*—Smith Frohwein Tempel Greenlee Blaha LLC

(57) ABSTRACT

The present invention provides the ability to solicit and obtain updated information about a customer or person. The present invention can be incorporated into a service provision system and thus, request updated information from a customer attempting to access the service. In operation, when the customer requests a service, the customer either provides or is requested to provide sufficient information to identify the customer. The system then extracts a customer profile based on the identity of the customer. Portions or all of the customer profile is then presented to the customer to verify for correctness. If the information is incorrect, the customer can provide updated information immediately to the system. The system can force the customer to either update the information or affirmatively indicate the information is correct before providing the service.

7 Claims, 5 Drawing Sheets

Purpose Change of Address Form

PO Boxes Are Not Permitted

Please Print in Ink

Address Line 1

Address Line 2

City

State    Zip

*Minimum age for account opening is 19 years in AL and NE; 21 years in PR.*

REAL-TIME POINT-OF-SALE CHANGE-OF-ADDRESS PROCESSING

CROSS REFERENCE TO RELATED APPLICATIONS

The present invention is related to and incorporates by reference the following applications for United States patents:

System for Providing a Checkless Checking Account filed on Aug. 22, 2003 and assigned Ser. No. 10/645,949; and System and Method for Dynamically Managing a Financial Account filed on Aug. 22, 2003 and assigned Ser. No. 10/646,150.

The present application in a continuation in part of U.S. patent application Ser. No. 10/685,277 filed on Oct. 4, 2003.

TECHNICAL FIELD

The present invention relates to banking industries and, more particularly, to providing the ability for consumers to update critical account information through a terminal located at merchant facilities.

BACKGROUND OF THE INVENTION

Throughout the years, a main focus providing services to consumers has been convenience. It is quite clear to even the most simplistic marketing analyst that the more convenient you can make a service to the consumer, the more likely the consumer will partake in the service. It is on this foundation that the majority of Internet services are based.

The Internet is not always the final answer in providing convenience to the consumer. In some instances, consumers are simply reluctant to conduct business over the Internet due to a variety of reasons, such as fear of losing confidentiality, resistance to relying on modern technology and sometimes, just stubbornness. Thus, there has been, is and remains a need in the art for providing face to face, plain old ordinary customer service.

The banking and credit industry is particularly poised in this predicament. Consumers that are engaging in financial transactions or receiving financial services often times prefer to deal with an institution rather than the Internet. Thus, marketers are still challenged with increasing the convenience at which such services are offered.

One avenue that has been extensively explored for providing financial services is through merchants. Consumers typically are willing to trust a merchant that is offering a financial service. This is evident in the fact that nearly every department store offers a credit program to their customers.

Typically, merchants are limited to the types of financial services that they can provide. This limitation can be due to a variety of factors including the cost that the merchant must incur to provide the service, the technological complexities of providing the service, and the training required for the merchant's employees. However, anyone that has completed a marketing 101 class will agree that the more services a merchant can offer, the more foot traffic the merchant will generate and thus, the higher probability the merchant will get a sale.

Thus, there is a need in the art for a solution that enables a merchant to provide multiple financial services to its customers that is commercially feasible to the merchant, not overly complicated from a technological perspective, and that minimizes the training required for the merchant's employees.

For services that are related to financial transactions and the issuance of credit, it is very important to maintain correct information about a customer, such as the customers address and contact information. In our mobile society, home addresses and mailing address are in constant need of updating. For the credit industry, this can be quite problematic due to the fact that the ability to collect drastically decreases in proportion to the lack of ability to contact a debtor. Traditionally, contact information has been updated through the mail. When paying a bill, customers are offered the opportunity to fill out a change of address form to send along with the payment. Once received, this information can be entered in on the user's behalf. This technique for updating address information is problematic in that it is totally reliant upon the customer being responsible to send in the change of address information and the turn-around time for obtaining, entering and implementing the change of address can be on the order of weeks. Such delays can easily result in bills being sent to wrong addresses or a total loss of contact with a debtor. Even for delays of one billing cycle, credit companies can easily lose significant amounts of income.

On Oct. 26, 2001, President Bush signed the USA Patriot Act (USAPA) into law. Under the USAPA, there are requirements imposed on financial service providers or institutions are required to have a correct address on a customer prior to opening an account. Thus, there is a need in the art for a technique that allows customer information to be updated in a more reliable and expeditious manner.

SUMMARY OF THE INVENTION

The present invention is a unique and novel solution to these needs in the art and includes a system, method and apparatus for requesting and obtaining customer information, such as change-of address-information at and in a convenient manner, such as at a point-of-sale terminal. This information can be requested, accepted and processed in real-time.

The present invention includes a multi-functional terminal interconnected with a back-end office that allows a merchant to provide a plurality of financial services to a customer. The multi-functional terminal is operable to accept, read and process a variety of items including, but not limited to, debit/credit or ATM cards, checks, money orders, cashiers checks, travelers checks, as well as a drivers licenses, state identification cards, and birth certificates. In addition, the multi-functional terminal can accept a variety of types of information that may be input, such as but not limited to, an individual's direct deposit account (DDA) number, savings account number, etc. One key aspect of the multi-functional terminal is the ability to provide change of address information requests and accept change of address information. The multi-functional terminal also operates to facilitate a purchase, transfer of funds, wire of funds, cash-back option, etc. at a merchant location. The multi-functional terminal advantageously can be used at a merchant location to allow an individual to purchase pre-paid credit-type cards, pre-paid telecom cards, stamps, etc. at the terminal.

In operation, the multi-functional terminal of the present invention comprises a data interface, a processor and a network interface. The data interface interfaces to a plurality of data sources to extract data needed for a particular financial service. The network interface interfaces to a plurality of networks, servers or an individual network or server to obtain verification or authorization information utilized in providing a particular financial service. The processor will control the data flow from the data interface to the network interface, analyze the data and determine the data required for any particular financial service, create account information if necessary, verify data and enable and perform financial services, update the data after completing a financial service if necessary, and any other financial service related processing.

The data interface component operates to obtain the data necessary to perform the financial service selected by the individual. Several techniques can be employed to obtain the data and although there are preferred techniques described herein, the present invention should not be limited to any particular technique. Advantageously the present invention has the capability of collecting an initial deposit of funds from an individual at the same time as the data is collected in the case of the purchase of a pre-paid credit-type card or phone card. The data collected can include, but is not limited to, information such as the customer's name, date of birth, contact information, government identification such as a Social Security Number, financial status, marital status, employment history, references, or the like. In addition, some level of prior behavior such as the customer's insufficient funds history maybe included. The system may also run a credit check on new or renewing customers.

Another aspect of the invention is the collection of the data. The collection may be performed by a number of different methods including, but not limited to, a magnetic type device, a bar code reader, a scanner, a templated scanner, a keyboard, a touch-screen, a microphone, a bio-metric reader, etc. Basically, any item that may contain individual information can be collected by the data interface. The data interface is universal so that any data source may be utilized to supply data.

Another aspect of the invention is the data processing. The processor may require specific data for any particular financial transaction. Once the financial service is established the processor analyzes the data to determine if the appropriate data is present. If additional data is required, the processor will notify the individual or merchant. The processor can analyze and sort the data to extract the required information. In addition, the processor may analyze the data source to determine what data is present on the source and additionally, where on the data source the data is present. For example, one technique, when a templated scanner is utilized to collect data, the processor will first determine the type of data source, i.e. a drivers license, social security card, etc. Then, the processor will associate a template with the particular type of data source to extract the necessary data from that source to perform the selected financial service. Then, the pertinent data will be utilized in the particular financial service. Several techniques can be employed to obtain the data and although there are preferred techniques described herein, the present invention should not be limited to any particular technique.

A specific aspect of the present invention is the ability to request, obtain and process changes of information related to the customer. For instance, at the time a financial service is being provided, whether that service is a purchase, a cash withdrawal, and credit card application or the like, the customer will enter enough information to be identified as that customer. Once identified, the system can prompt the customer as to whether address or other information needs to be updated. If the customer provides an affirmative response, the system can provide a change of address for that can be completed by the customer, scanned into the system and provided to the back-end office instantaneously for processing.

BRIEF DESCRIPTION OF THE DRAWINGS

FIG. 5 is a diagram illustrating an exemplary change-of-address form that can be provided by various embodiments of the present invention.

DETAILED DESCRIPTION

In general, the present invention can be described as a novel system, method and apparatus for a customer, or potential customer, to provide change-of-address information, or current address information to a financial service provider or other service provider that maintains such information. The advantages of the system are conveniently realized when the invention is provided in conjunction with point-of-sale merchant based financial services. For instance, a merchant may be provided with a terminal to be used in providing a variety of financial services including, but not limited to, application and issuance of credit cards, pre-pay cards, stored value cards and checkless checking account cards. When a customer requests one or more of these services, the present invention can be invoked to request to verify current address or other information regarding the customer. If the information is incorrect or needs to be updated, the customer can provide the new/modified information at that moment. The updated/modified information can then be provided to the service provider for updating in its database. Advantageously, the present invention allows for such information to be solicited and updated in real-time and thus, among other things, addresses the requirements set forth under the USAPA.

The exemplary embodiments described herein are for illustrative purposes only and, a person skilled in the art will construe them broadly. It should be understood that the features and aspects of the present invention can be ported into a variety of systems and system/network configurations and any examples provided within this description are for illustrative purposes only. Referring now to the figures and drawings, in which like numerals refer to like elements throughout the several views, exemplary embodiments of the present invention are described.

Figure 1:
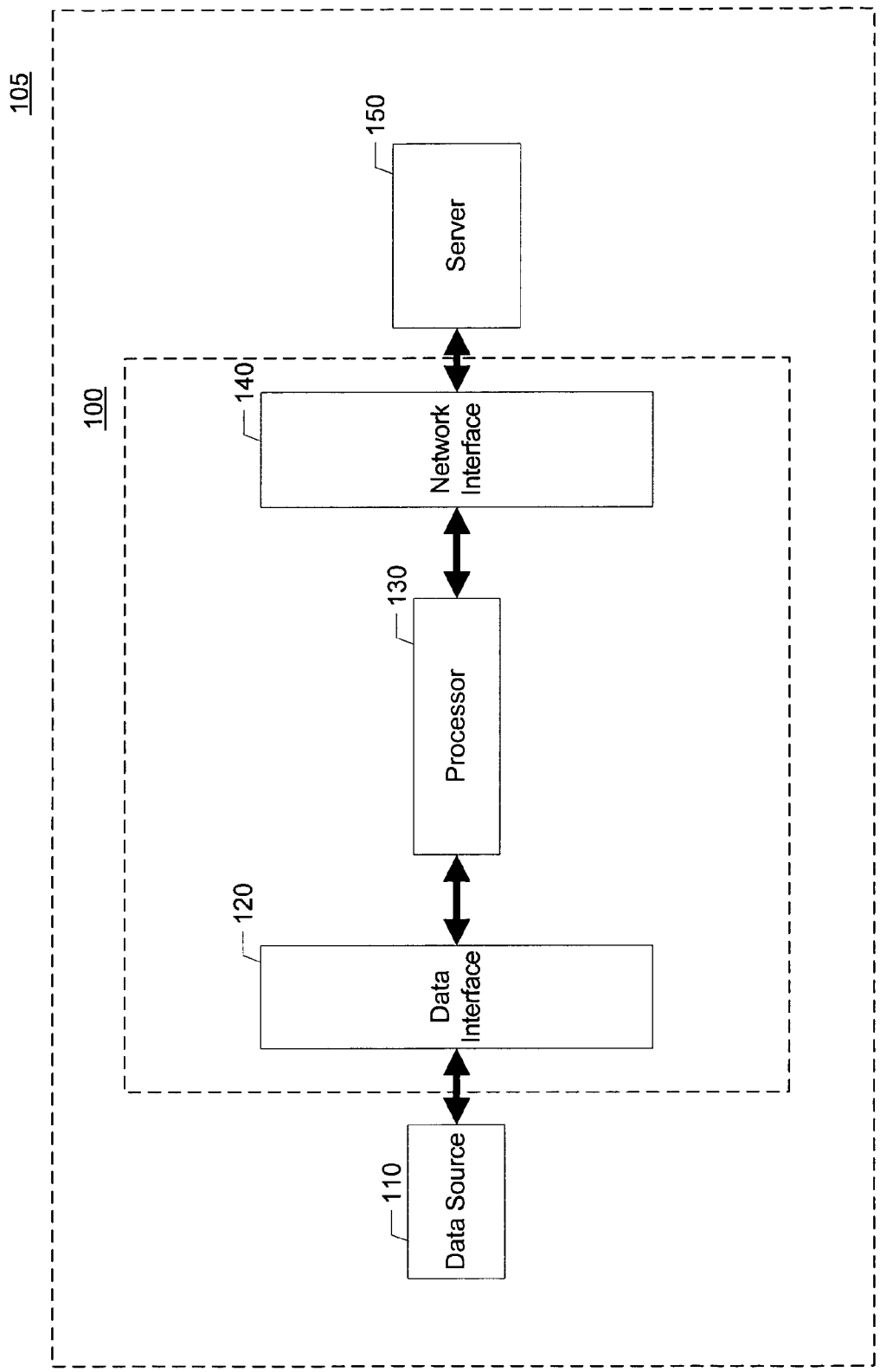
FIG. 1 is a diagram illustrating an exemplary embodiment of a terminal that facilitates the provision of a variety of financial services.

FIG. 1 is a diagram illustrating an exemplary embodiment of a terminal 100 that facilitates the provision of a variety of financial services. The terminal 100 is comprised of a processor 130, a data interface 120 and a network interface 140.

The data interface 120 is coupled both to the processor 130 and can interface to a data source 110. One function of the data interface 120 is to extract session data from the data source 110 and transfer the session data to the processor 130. Another function of the data interface 120 is transferring modified session data from the processor 130 to the data source 110. Thus, in some embodiments, the data interface 120 can transfer data bi-directionally. The data interface 120 may be any type of interface capable of extracting and/or writing to a data source 110. The data interface 120 may incorporate the hardware necessary to read/write to the data source 110 or may simply be an interface to a hardware device such as a bar code reader/writer, a magnetic reader/writer, a scanner, a templated scanner, a printer, a bio-metric identification device, a pass-through inlet/outlet, etc. Further, the data source 110 may consist of many different types of sources, including, but not limited to, a bar code, a magnetic-type card or magnetic storage device, scannable media, writable media, a fingerprint, a keyboard or keypad, a mouse, a light-pen, a touch pad, a display, or any other type of data device. The session data is data that may be utilized in a particular financial service transaction. The session data may be located on the data source 110, or alternatively, may be inputted manually. The session data may include, but is not limited to, name, date of birth, address, telephone number, social security number, verified government identification, direct deposit account (DDA) information and number, savings account information and number, credit history, debt to credit ratio, asset information, a type of financial service, a transaction amount, card account number, etc.

The network interface 140 is coupled to the processor 130 and interfaces to a server 150. One function of the network interface 140 is to provide session data to the server 150. Another function of the network interface 140 is obtaining validation from the server 150 and providing it to the processor 130. The server 150 validates all or a portion of the session data for a variety of different purposes depending on the particular financial service involved, and may interact with other external systems to provide the financial service. The validation may include, but is not limited to, an approval for a financial service, a denial for a financial service, an available balance or fund verification, a credit worthiness verification, a billing address verification, etc.

The processor 130 is coupled to both the data interface 120 and the network interface 140. One function of the processor 130 is processing the session data and executing or initiating the provision of a plurality of financial services. The processor 130 receives the session data from the data interface 120 and requests a validation from the server 150, based at least in part on the session data, through the network interface 140. Further, the processor 130 provides or initiates the provision of a plurality of financial services and in some embodiments, is capable of updating the session data stored on the data source 110 based at least in part on the provision of the particular financial service. The plurality of financial services may include, but are not limited to, purchasing pre-paid cards, pre-paid card acceptance, credit card acceptance, debit card acceptance, check acceptance, point of sale purchase, cash back on point of sale purchase, transfers, card-to-card activity, bill payment, loyalty acceptance, etc. In conjunction with each of these financial services, the customer may be required to update particular information, such as the contact information for the customer.

FIG. 1 also illustrates the multi-functional terminal 100 within a system 105 for providing financial services. The system 105 includes: the terminal 100, a server 150 and one or more data sources 110. In operation, the multi-functional terminal 100 is provided to a merchant for use in store operation. The terminal 100 is interfaced to and granted access to the server 150. The interface to the server 150 can be provided in a variety of fashions including, but not limited to, DSL, T1, broadband, wireless, telephonic and satellite connectivity. The server 150 may be a stand-alone provider of a financial service or, may interact with one or more other systems to provide, report, authenticate, validate or supplement the provision of a financial service. The multi-functional terminal 100 is available to merchant employees in providing the financial services to customers. Depending on the desired financial service, a customer obtains and/or presents a data source 110 to the merchant in conjunction with selecting a financial service to be provided.

Figure 2:
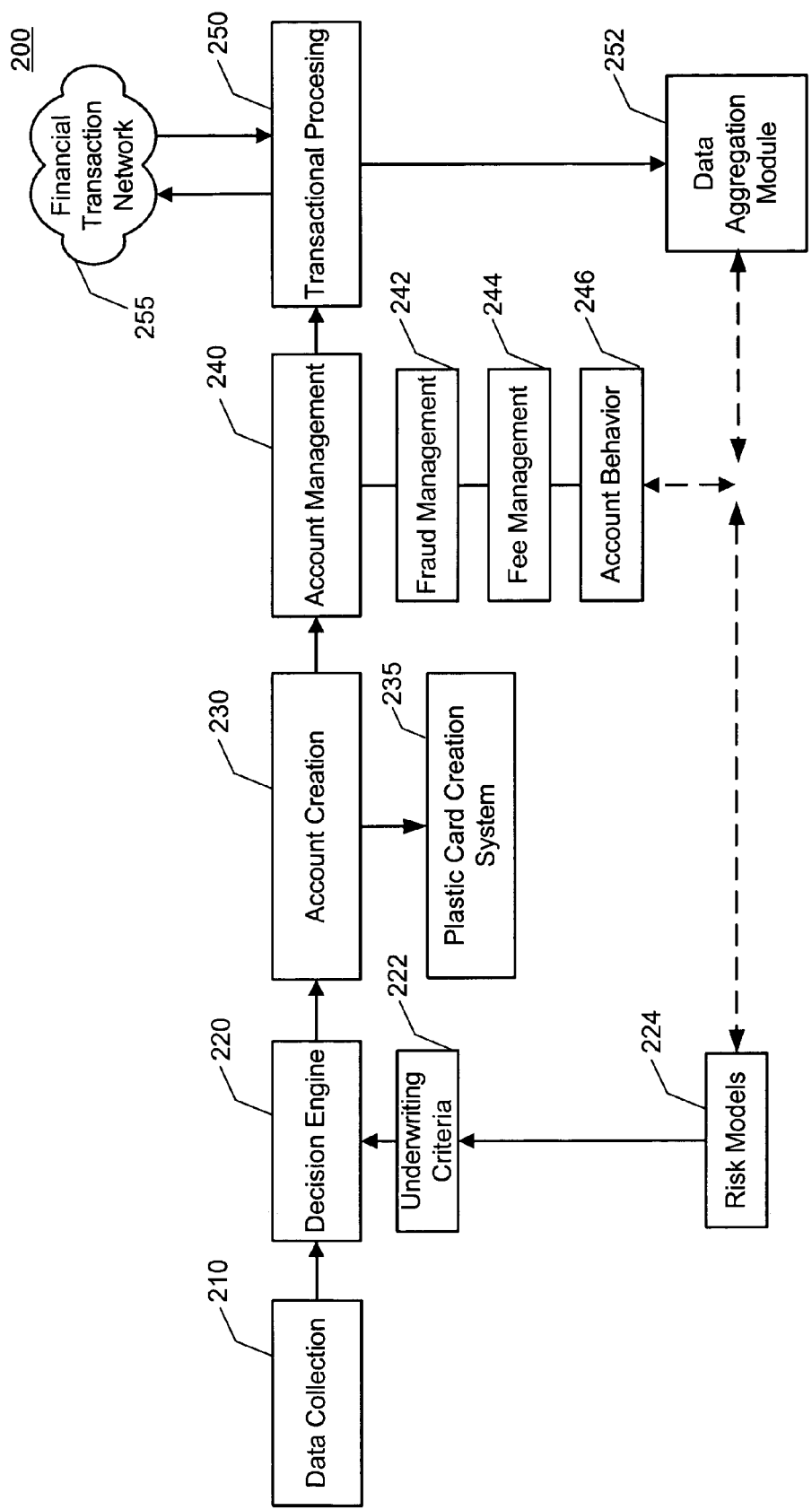
FIG. 2 is a flow diagram illustrating an overview of the steps and components that can be utilized in conjunction with implementing various embodiments of the present invention.

FIG. 2 is a flow diagram 200 illustrating an exemplary embodiment suitable for incorporation of the present invention. The details of the operation of the flow diagram 200 may vary among various embodiments of the present invention. In general, the illustrated embodiment includes five main functions or components: the data collection component 210, the decision engine 220, the account creation component 230, the account management component 240 and the transactional processing component 250. It should be understood that the structure illustrated in this figure is for discussion purposes only and the various functions or components of the present system could be combined or split in many manners.

The data collection component 210 collects data or information relevant to: opening a credit account (account formation data 212), determining if an applicant can qualify for an account, the type of account to be opened (account option data 214), and other miscellaneous data. The information collected with regards to the account formation data 212 may include, but is not limited to, the applicant's name, date of birth, mailing, residential and business addresses, telephone numbers, social security number or verified government identification number, direct deposit account (DDA) information and account number, savings account information and account number, credit history, debt to credit ratio, assets, marital status, employment history etc.

During the data collection process 210, the customer may be prompted regarding current demographic information. For instance, in one embodiment of the invention, once the customer enters a sufficient amount of information to be identified by the system, the system will access current account information for the customer and display that information for the customer's review. In addition, the system can prompt the customer to confirm whether or not the presented information is current. If the information is not correct, the customer can be required or requested to provide new/corrected/modified information.

The decision engine 220 receives raw or processed data from the data collection component 210 and, among other functions, integrates it with underwriting criteria 222 to determine if a customer qualifies for an account. The underwriting criteria 222 is initially determined using a collection of integrated algorithms, methods of work, business processes, and initial risk modules 224 that enable the analysis, issuance, distribution, and monitoring of an integrated credit product. The initial risk models 224 are compiled from a variety of different sources that vary by issuer and one skilled in the art is familiar with the type of information that is associated with them. In addition to determining if a customer qualifies for an account, the decision engine system 220 also determines if a customer qualifies for any applicable account option data 214 selected in the data collection system 210. For example, if a customer selected an overdraft option in the account option data 214, the decision engine 220 would determine if the customer qualified for that option and, if qualified, the amount of the overdraft limit. The decision engine 220 uses the account formation data 212 to qualify the customer and perform a risk management processes. The customer is subjected to underwriting criteria 222 to determine qualification and some additional data or documents may be required for the process.

Once a customer is qualified, the account creation component 230 proceeds to open an account. The account creation component 230 may perform different functions depending upon the account option data 214. Preferably, the account creation component 230 operates to create an account for the customer in a manner that is in compliance with all applicable local, state and federal laws. During the account creation, the account creation component 230 may utilize various procedures to support issuer risk mitigation requirements. The account creation component 230 also includes a plastic card creation component 235 that operates to generate a permanent card for the customer.

The procedures performed by the account creation component 230 may vary depending on the type of account being created. In the examples provided in the incorporated reference, the three account types include the instant issue card, the basic card and the basic card with overdraft protection. Other functions that may be performed by the account creation component 230 include the activation of the account the issuance of cards. The details of these functions are more specifically described in the incorporated reference.

The account management component 240 manages the customer account by utilizing controllers to enable and disable certain functions and privileges of the account based on various factors. Some of the factors can include account risks and customer behaviors. In one embodiment, the account management component 240 can include the functions of fraud management model 242, fee management model 244 and account behavior model 246. The fraud management model 242 can utilize the operation of the account behavior model 246 to determine if any fraudulent activities are associated with the account. If any fraudulent activities are detected, the account management component 240 can be notified by the fraud management model 242 to suspend the account. The fee management model 244 determines and assesses any applicable fees to be charged against the account. For example, if the account is overdue, a late fee would be assessed to the account. In the various embodiments, additional fees can be assessed against the accounts. For instance, a one time fee may be assessed for the creation of the account or for the creation of certain accounts, such as accounts having an overdraft component 234. In addition, the account may include a fixed number of transactions or a fixed number of transactions per fixed period (i.e. per month). Once the fixed number of transactions is exceeded, additional transactions can be assessed a transaction fee. In another embodiment, a monthly fee may be assessed on the account.

The account behavior model 246 examines account activity and looks for patterns in the account activity to determine possible actions to be taken (i.e. intervention to stop fraud). For example, if an account appeared to have sporadic spending or if the stored value became zero, the account could be turned off temporarily to ascertain if the account is being defrauded. The transactional processing component 250 processes and monitors the day to day transactions between the account and the financial transaction network 255. The transactional processing component 250 is then compiled by the data aggregation module 252.

The data aggregation module 252 may work on data related to the entire population of account holders, groups of populations based on factors such as age, occupation, areas of domicile etc. or even individuals. The data aggregation module 252 provides processed outputs to the risk models 224 and the account behavior 246 model.

A key aspect of the present invention is found in the operation of the account management component 240. The account management component 240 of the present invention enables the dynamic management and alteration of the financial account based on real-time and current information. Two controlling factors are applied to the account management component 240. These controlling factors include the output of risk models 242 that have been run on the initial underwriting criteria collected by the data collection component 210, as well as the output of the data aggregation module 252.

The data aggregation module 252 refines and updates, preferably on a real-time basis, the various current trends of the accounts being managed. This information is then fed into the risk models 224 which determine new underwriting criteria 222, and the account behavior 246 model. The data aggregation module 252 can feed information into the risk models 224 and the account behavior 246 model at periodic intervals, continuously, autonomously, on request, or on other bases. The account behavior model 246 can operate to alter the parameters of the operation of the credit account. The account behavior model 246 can base these alterations on the input from the aggregation module 252 and/or the risk models 224. Thus, in operation, the data aggregation module 252 may identify trends for a particular subset of the population. This information in turn can be used by the risk models 224 to identify certain risks associated with the particular subset or related subsets of the population. This information, as well as the information directly provided from the data aggregation module 252 can serve as the basis for altering the parameters of the credit account. As a particular example, suppose that the data aggregation module 252 identifies an increase in transactions by customers identified as working in the airline sector and the risk models 224 indicate a decline in job stability in the transportation industry. The account behavior model 246 may utilize this information to decrease the lines of credit provided to customers working in the airline sector, increase fees associated with their accounts, provide a higher level of scrutiny on approvals of purchases, lock the account from further purchases, or the like. From a fraud perspective, the account behavior model can receive information from the data aggregation module 252 that may be an indication of fraudulent behavior. The account behavior module 246 can then take actions to limit or alleviate the risk of fraud.

Similarly, the risk models 224 can receive input from the data aggregation module 252 and/or the account behavior model 246. The information fed to the risk models 224 is used as the basis for generating new underwriting criteria for qualifying new individuals for accounts. The new underwriting criterion provides more accurate real-time criteria that are not otherwise available when using underwriting criteria that has only been created at the initial stages of qualification.

Figure 3:
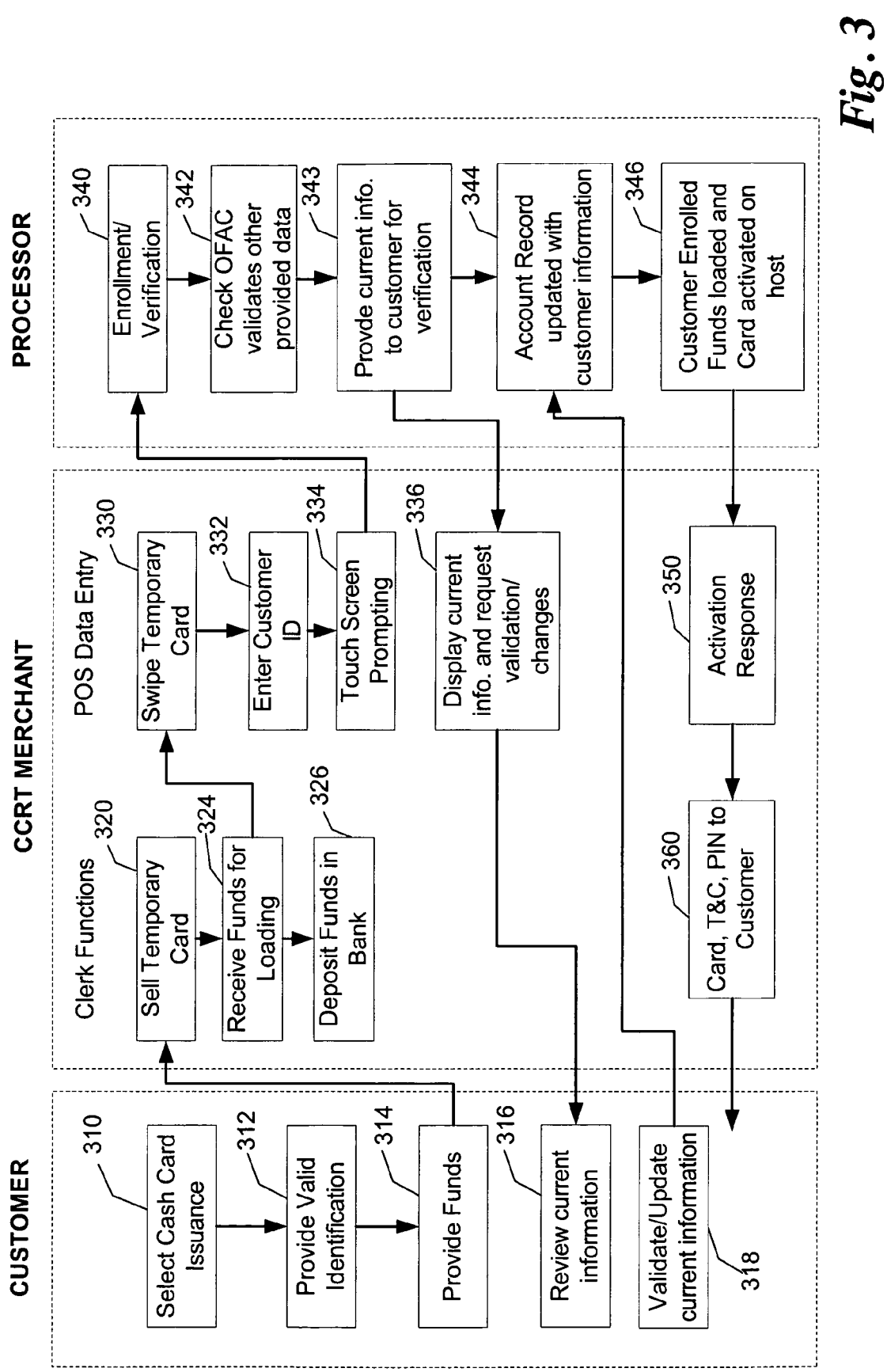
FIG. 3 is a flow diagram illustrating the processes involved in providing the financial service of issuing a cash card to a customer through the use of the multi-functional terminal of the present invention.

FIG. 3 is a flow diagram illustrating an integration of the present invention into a process that provides the financial service of issuing a cash card to a customer through the use of the multi-function terminal 100 of the present invention 300. Initially a customer approaches a merchant that has a multi-function terminal. The customer selects, or with the help of the merchant, selects the financial option of the issuance of a cash card 310. The customer is then prompted to provide valid identification 312 and funding for the cash card 314.

The merchant's clerk working with the customer initiates the sell of a temporary card 320. The clerk then receives the funding from the customer that will be used for loading value into the cash card 324. Independently the merchant deposits the funds in a banking institution, transfers the funds to an appropriate account or issues a transaction against a credit card 326. In addition, the clerk swipes the temporary card through the terminal 330. The terminal 100 reads the magnetic strip on the back of the temporary card and extracts an identification number for the card. The clerk then enters the identification of the customer 332. The identification can be obtained from the valid identification presented by the customer or through some other means. The clerk then follows one or more steps prompted by the multi-functional terminal. In the illustrated embodiment, this is done through a touch screen on the multi-function terminal 334.

The information collected at this point in the process is passed to a processor that first operates to enroll the customer and verify the information received from the customer 340. The processor then conducts an OFAC check and validates other data provided by the customer 342. Once the current data for the customer is collected, the system will provide the current information to the customer by sending the information to the terminal 100 for verification 343. The current information is then displayed on the terminal 100 along with a request or prompt for the information to be verified 336. At this point, the merchant can request the customer to review the current information by looking at the screen or display of the terminal or by printing out a hard copy of the information. The customer is then required or allowed to review the current information 316. If the current information is correct, the customer and/or merchant can indicate so by using the terminal 318. In this situation, the processor will continue by either creating an account record, or updating if this is a repeat customer, with the customer information 344. If the information is not current or correct, the customer/merchant indicated this using the terminal 318. In response to an indication that the information is not current or correct, a change of information request form can either be displayed on the terminal 100 or printed on paper for the customer. If displayed on the terminal, the customer/merchant can simply type in the correct information. If the form is printed out for the customer, the customer/merchant can complete the change of information form and scan it in using the terminal. In either scenario, the updated/corrected information is then provided to the processor to be considered when creating the account record 344. The processor then operates to enroll the customer, load the provided funds onto a card and activate the card in conjunction with a host or server managing the processor 346.

If the customer is approved, an activation response is provided to the multi-functional terminal 350 and a card, terms and conditions and a PIN is provided to the customer 360. At this point the customer is then able to use the temporary card. In some embodiments, a permanent card will then be created and mailed to the customer.

Figure 4:
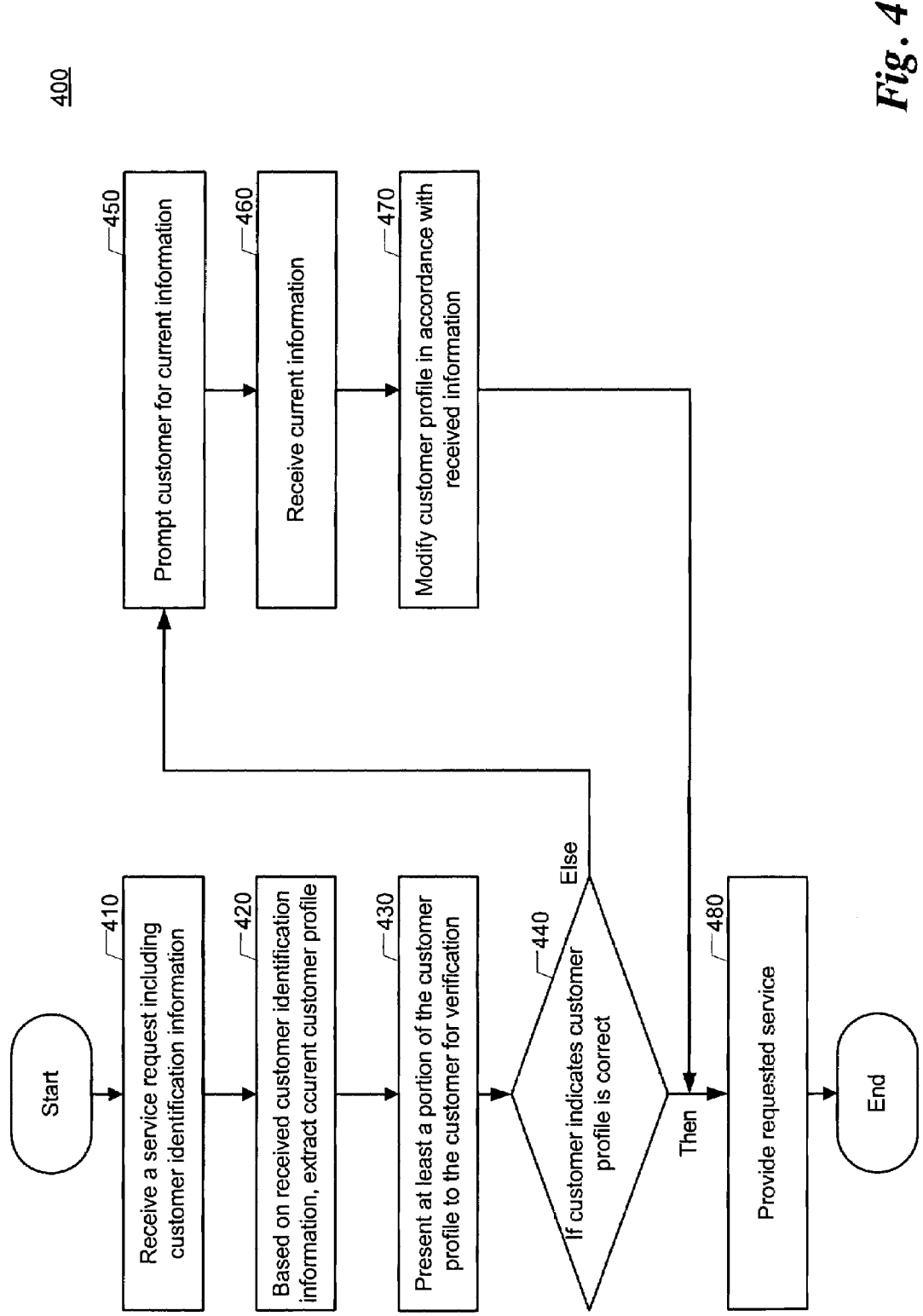
FIG. 4 is a flow diagram illustrating the operation of an exemplary embodiment of the present invention in providing the change-of-address request and update service.

FIG. 4 is a flow diagram illustrating the operation of an exemplary embodiment of the present invention in providing the change-of-address request and update service. Although the present invention can be embodied or implemented in a variety of settings, in conjunction with FIG. 4 the present invention is described a part of the provision of a service to a customer. The present invention can be incorporated into a variety of other applications such as a logon process to access a particular service, a kiosk logon process, utilizing an ATM or the like. At step 410, a system implementing the present invention receives a service request. The service request can include a variety of services including, but not limited to, applying for a credit card, purchasing a pre-paid card, adding to or purchasing a stored value card, making a purchase, or the like. During the service request, the customer either provides or is prompted to provide sufficient information to identify the customer. This sufficient information could include a variety of information such as the customer's name, address, portions of the address, personal identification code, Zipcode, customer code etc. Once the information is entered, at step 420 the system extracts or accesses customer profile information based at least on a portion of the information provided by the customer. Once the customer profile is obtained, at step 430 the customer profile, or a portion of the customer profile, is presented to the customer for verification. Other variations to the invention may include pre-processing the customer profile to determine if the information may need to be updated. For instance, if the information is aged (i.e., has not been updated for an extended period of time or a threshold period of time) the system may conclude that the customer profile may need updating and then proceed to present the customer profile to the customer for verification. In some embodiments, the system may always assume that the customer profile needs updating and automatically present the date to the customer for verification. In other embodiments, the system may perform a heuristic analysis to determine if the customer profile is suspect (i.e., appears to meet certain criteria that is common for out of date or incorrect customer profiles). One such technique is when the address of the terminal being used by the customer is outside of a particular range from the address stored in the customer profile. Thus, the system may conclude that the customer is either traveling or has moved. In either case, the system may then present the customer profile to the customer for validation. In other embodiments, the system may request validation on a periodic or an aperiodic basis. Yet in an other embodiment, the system may never prompt the user but rather, only seek validation if the user inquires or for particular service requests.

Once the system decides to present the customer profile information to the customer, the customer then has the opportunity to review the presented information to determine if it is correct or if it needs to be updated. In some embodiments, this may simply be a polite request that the customer can bypass. In other embodiments, the verification can be a required step that will not allow for the provision of the requested service unless the customer responds appropriately. In other embodiments, the customer may be able to bypass a certain number of request but after that number, be required to respond prior to the provision of the service. The profile information can be provided to the customer in a variety of manners including being displayed on a terminal or monitor, being recited audibly over a telephone connection or speaker, or being printed out on paper. At step 440 the customer must respond by indicating whether the information is correct. If the information is correct, the system then provides the requested service at step 480.

If the profile information is not correct, the customer provides an indication that the customer profile should be updated. In some embodiments, this indication may be a direct action taken by the user, such as pressing a key on a terminal, selecting an icon or field on a display screen, providing a spoken response to a voice automated system, or the like. If the indication is a direct action, the customer may then be prompted to enter current information at step 450. The indication can also be a passive action such as the customer providing updated information immediately rather then providing a response and then updated information. In essence, the updated information in this embodiment operates as a response. In either case, at step 460 the current/corrected information is received. The customer profile is then updated based on the received current information at step 470 and then the system provides the requested service at step 480.

The current or corrected information may be provided by the customer using a variety of techniques, including but not limited to, completing an electronic form displayed on a computer, responding audibly to a voice automation system or filling out a paper form.

FIG. 5 is a diagram illustrating an exemplary change-of-address form 500 that can be provided by various embodiments of the present invention. The exact format and content of this form can vary greatly and this format is only provided for illustrative purposes. In an embodiment of the invention that utilizes a paper form as illustrated in FIG. 5, when the customer indicates that the profile information is not correct, the form can automatically be printed. Alternatively, the form can be printed automatically when the user requests the service or, it could already be available at the terminal location. In this embodiment, the customer completes the form and then the form is scanned into the terminal. This information is then provided to the system and a system operator can manually enter the information into the customer's profile. It will be appreciated that this process can be further automated with the use of electronic forms or other automated techniques for entering and processing data. The form shown in FIG. 5 is preferably printed in a light grey format so that the information entered by the customer is more readily identifiable in a scanned image.

One aspect of the present invention is providing an entire suite of financial services that are available to a customer, or a customer working with a merchant. The first step in providing the suite of financial services is providing a multi-functional terminal to a merchant. In conjunction with this, the multi-functional terminal can be integrated into the merchant's communication infrastructure as well as being connected to the server that operates in conjunction with the terminal. The multi-functional terminal is operable to provide the suite of financial services to a customer.

Once the multi-functional terminal or terminals are installed and operational at the merchant location, the multi-functional terminal can be accessed by a customer and/or a merchant to initiate the provision of a financial service selected from the suite of financial services available.

One of the overall purposes of the present invention is to allow customers to have instant access to a suite of financial services at a variety of locations convenient to the customer. Thus, the service provider of the financial services equips multiple merchants with the terminal 100 equipment. Another overall purpose of the present invention is to verify and solicit current information regarding the customer at the onset of providing the financial service.

The suite of financial services can be accessed from the multi-functional terminal 100 in a variety of manners. Thus, in an exemplary embodiment, a terminal 100 gives a service provider the ability to identify and process a customer requesting a financial service at a retail merchant point of sale. The terminal 100 operating in conjunction with the server 150 and other resources insures compliance with identification and qualification requirements established by competent authorities and/or the service provider. The merchant makes the terminal 100 available for use by a customer or the merchant operates the terminal 100 on behalf of the customer.

The financial service can include one of several financial services, such as purchasing a stored-value card, transferring of funds, wiring funds, obtaining cash in an ATM fashion, purchasing a pre-paid credit-type card, purchasing a pre-paid telecom card, stamps, etc. at the terminal. One key aspect of the present invention is that a single terminal 100 can provide any and all of these financial services as well as other services.

In one embodiment a menu of services available can be displayed on a screen and selected by a customer and/or merchant. In another embodiment, the customer may swipe a card through the card reader of the terminal 100 and after identifying the customer or card identification, the terminal 100 can indicate the financial services available. In addition, it should be noted that the terminal 100 can operate in conjunction with the server 150 to determine the financial services available to the customer. Regardless of the method of indicating the services available or the method employed for selecting one of the suite of services, the terminal 100 receives a selection for a financial service. The selection is made from the plurality of financial services available to the customer.

The selected financial service is performed. This process can vary greatly depending on the selected financial service. However, in most situations, the customer is prompted to provide additional information that is entered into the multi-functional terminal 100 in one of the various previous manners disclosed. Once the multi-functional terminal 100 has sufficient information, the multi-function terminal 100 interacts with the server to determine if the financial service can be provided, if the customer qualifies and to verify the information is correct. This process may involve requesting additional information from the customer and/or the merchant. Ultimately, the financial service is provided to the customer.

A fee is collected from the customer for the provision of the financial service. As has been described, this fee can be collected in a variety of manners including cash, credit cards, bank transfers or the like.

A key aspect of the present invention is the step of compensating the merchant with a portion of the fee collected from the customer. This varies from the current state of the art. Traditionally, merchants have paid a fee to have terminal equipment installed on their premises and/or paid a fee for certain transactions. The system implementation of the present invention utilizes various means for compensating the merchant for housing and operating the equipment at the merchant's location. In one embodiment, the merchant may simply be given a flat fee for each terminal 100. In another embodiment, the merchant may be paid a fee based on the number of terminals 100 and the number of transactions provided using the terminals 100. In yet another embodiment, the merchant may be compensated based solely on the number of transactions. In yet another embodiment, the merchant may be compensated based on a percentage value of the transactions. Those skilled in the art will appreciate that any of these compensation methods, as well as a combination of one or more of these methods maybe utilized and the present invention is not limited to any particular configuration.

The Suite of Services

The present invention can be utilized to provide a suite of financial services to a customer at a variety of merchant locations. The general descriptions of these financial services are provided below.

Stored-Value Card. For the financial service of purchasing a stored-value card, the customer purchases a pre-paid or stored-value magnetic-type card (the data source 110), from the merchant. The detailed components for this financial service were described in conjunction with FIG. 3. The overall operation of this financial service enables the merchant to initiate and issue a stored-value card. The merchant can accept payment for the card in a variety of manners including cash, credit card, money transfer, check, etc. The merchant may supply and swipe the card through a magnetic card reader (the data interface 120), interfaced to the terminal 100. This process allows the terminal 100 to capture the account number of the card. The merchant may then enter a value for the card into the terminal 100 through the data interface 120. As previously described, this information can be provided to the terminal 100 in a variety of manners including the use of a keyboard, scanner, magnetic card reader or the like. In one embodiment, the merchant may acquire certain additional information from the customer, such as the customer's name, date of birth, social security number, DDA number, etc.). The merchant may then enter this information into the data interface 120 of terminal 100. Although this aspect of the invention is being described as a customer and merchant performing certain tasks, it should be understood that either of the participants could perform the tasks and some of the tasks could even be automated.

Once the merchant has collected all of the information, or even during the information collection process, all or portions of the information are provided to the server 150 through the network interface 140. The server processes the information in a manner that is familiar to those skilled in the art. The incorporated references provide further information regarding this process. The merchant then waits for the terminal 100 to receive authorization from the server 150.

The funds for the stored-value card can be provided by the customer in a variety of manners. In one embodiment, the stored-value card may be funded directly from the customers direct deposit account (DDA), thus the limit of the pre-paid or stored value card is the amount taken from the account and placed on the card. In another embodiment, the stored-value can be funded based on a credit as authorized by the service provider, thus the limit of the card is limited by the amount of credit authorized. The stored-value card can also be funded by a direct cash transaction at the terminal 100. Thus, the value of the stored-value card can be selected by the customer or merchant and as long as funds are available, The authorization of the stored-value card can be based on a number of factors, including, but not limited to, credit worthiness, credit history, credit score, balances in customer accounts, etc. Once an authorization has occurred, the card is activated and a stored value or credit limit is associated with the card. In one embodiment, the activation process may include writing information out to the data source 110, in this case the stored-value card. For instance, the value associated with the stored-value card, an expiration date, an authorized user name, PIN code, terminal 100 and/or merchant at which the card was activated, date of activation, or a variety of other information could be stored on the stored-value card. The customer may then make purchases from the merchant using the pre-paid or stored-value card.

In addition, once a financial service is provided, such as using the stored-value card, the terminal 100 can operate to update the session data after performing a financial service and sends the updated data to the data source 110. The customer can then use the terminal 100 to view activity data, history data or other data associated with the data source 110.

The process for issuing a stored-value card is also applicable to the purchasing a pre-paid credit-type card as well as a pre-paid telecom card.

Transferring of Funds. For the financial service of conducting a fund transfer, the customer initiates the transfer by selecting the appropriate feature from the terminal 100. The present invention can be used to transfer funds from one account into another account, from a stored-value card to an account, or from an account to a stored-value card. For transferring funds from one card to another, the customer can simply swipe the card through the card reader of the terminal 100 and select an option to transfer the balance, or a portion thereof to another card. The balance can be transferred to another card held by the customer or to another card not even owned by the customer. In this case, the customer will be required to enter a card identification number, account number and/or customer identification information into the terminal 100. The server 150 operates to receive the fund transfer request. If the transfer is a card to card transfer, the server 150 can communicate with the terminal 100 and instruct the customer to swipe the destination card or enter the necessary information to identify the destination for the transfer. If the transfer is to be made to a card not in the customer's possession, the server 150 can receive and maintain information regarding the transfer. Once the system is accessed by the destination card or a card associated with a customer or account destined to receive the transfer, the server 150 can initiate the completion of the transfer. If the funds are destined for an account, the server 150 can transfer the funds directly into the account once the appropriate information is entered. If the transfer request is to transfer funds from an account onto the card, the process is similar to that described in conjunction with the stored-value card financial service.

Wiring Funds. For the financial service of conducting a wiring fund transfer, the customer initiates the transfer by selecting the appropriate feature from the terminal 100. Similar to the funding options for the stored-value card, the customer can utilize the same options for funding the wiring transfer. The terminal 100 collects the necessary information by prompting the customer for the information. In the alternative, the server 150 can cause the terminal 150 to prompt for specific information. In either case or using a combination of both, the information is collected and transferred to the server. The server then actuates the wire transfer.

Cash-back. For the financial service of providing access to cash, the customer initiates the service by selecting the appropriate feature from the terminal 100. The funds to support cash access can be based on a credit card, money transfer, check, etc. The terminal 100 collects the necessary information by prompting the customer for the information. In the alternative, the server 150 can cause the terminal 150 to prompt for specific information. In either case or using a combination of both, the information is collected and transferred to the server. The server 150 then approves the financial service and gives in indication to the terminal 100. This same approach can be applied in the purchase of stamps.

Check Acceptance. The terminal 100 can also be used to authorize or verify payments by check. The check can be scanned at the terminal 100, and based on the account information, the server 150 can begin to process approval for the payment. The server 150 and or terminal 100 can request additional information from the customer to complete the financial service and the customer can enter that information at the terminal 100.

Bill Payment. The terminal 100 can be utilized by a customer 150 to pay bills. In operation, the customer enters information to identify the recipient of the bill, along with the amount, source of funds for making the payment, and the like. The terminal 100 and/or server 150 may interact with the customer to obtain additional information. The source of funds can be any of a variety of sources, or a combination of one or more sources, including but not limited to, a stored-value card, banking account, cash, check or the like.

Loyalty awards. The present invention also anticipates providing a loyalty awards program. As a customer receives financial services In one embodiment, the merchant charges a fee for the financial service, a portion of which is supplied to the service provider. In another embodiment, the terminal 100 automatically assesses and extracts a fee for a give financial service and apportions the fee appropriately to the merchant and/or the service provider.

In another exemplary embodiment, a terminal 100 interfaces with a templated scanner through the data interface 120. A templated scanner may be utilized where the data source 110 is a non-magnetic or non-bar coded card (i.e. a drivers license, official document, etc.). The templated scanner extracts session data from the data source 110 and transfers the session data to the processor 130. The processor 130 matches the data source 110 to a recognizable format and associates a pre-defined template to the data source 110. The processor 130 then extracts the data within the templated area for use in the authorization process.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although this disclosure describes the invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A system for updating customer information in real-time when providing services to the customer, the system comprising:
   a server;
   a terminal located at a merchant's facility and interfacing to the server over a network and a data interface for receiving a data source, the terminal being operable to:
   receive a service selection from a customer, the service selection includes customer identification information; and
   provide the service selection to the server;
   the server, in response to receiving the service selection:
   identifying customer profile information based on the customer identification information, the customer profile information comprising a customer address;
   determining that the customer address is to be updated; and
   if the customer address is to be updated, providing an indication to the customer through the terminal;
   the terminal being further operable to receive updated customer profile information at the data interface and providing the updated customer profile information to the server; and the server, in response to receiving the updated customer profile information, being further operable to provide the requested service; wherein the server is operable to apply heuristics to determine if the customer profile information should be updated by:
   identifying the location of the terminal at which the service selection was made;
   if the address of the terminal is outside a threshold radius of the address included in the customer profile information, then assuming the customer profile information is suspect; and
   if the customer profile information is suspect, determining the customer profile information should be updated.

2. The system of claim 1, wherein the terminal includes a scanner and the terminal is operable to receive updated customer profile information by scanning a filled out form.

3. The system of claim 1, wherein the terminal includes a display and an input device and the terminal is operable to receive updated customer profile information by providing an electronic form on the display and receiving input data through the input device.

4. The system of claim 1, wherein the terminal includes a speaker and microphone and the terminal is operable to receive updated customer profile information by providing audible prompts to the customer via the speaker and receiving audible responses via the microphone.

5. The system of claim 1, wherein the terminal includes a speaker and an input device and the terminal is operable to receive updated customer profile information by providing audible prompts to the customer via the speaker and receiving responses via the input device.

6. The system of claim 5, wherein the speaker and the input device are integrated into a telephone set type of interface.

7. A system for updating customer information in real-time when providing services to the customer, the system comprising:
   a server;
   a terminal located at a merchant's facility and interfacing to the server over a network and a data interface for receiving a data source, the terminal being operable to:
   receive a service selection from a customer, the service selection includes customer identification information; and
   provide the service selection to the server;
   the server, in response to receiving the service selection:
   identifying customer profile information based on the customer identification information, the customer profile information comprising a customer address;
   determining that the customer address is to be updated; and
   if the customer address is to be updated, providing an indication to the customer through the terminal;
   the terminal being further operable to receive updated customer profile information at the data interface and providing the updated customer profile information to the server; and the server, in response to receiving the updated customer profile information, being further operable to provide the requested service; wherein the server is operable to apply heuristics to determine if the customer profile information should be updated by:
   identifying the location of the terminal at which the service selection was made;
   if the address of the terminal is outside a threshold radius of the address included in the customer profile information, then assuming the customer profile information is suspect; and
   if the customer profile information is suspect, providing at least a portion of the customer profile information to the customer via the terminal; and
   requesting the customer to indicate whether the information is incorrect and thus should be updated.

* * * * *